United States Patent [19]

Goerl et al.

[11] Patent Number: 5,219,963
[45] Date of Patent: Jun. 15, 1993

[54] PEROXIDE VULCANIZABLE MOULDING MATERIALS AND A METHOD OF THEIR MANUFACTURE

[75] Inventors: Udo Goerl, Meckenheim; Siegfried Wolff, Bornheim-Merten, both of Fed. Rep. of Germany

[73] Assignee: Degussa Aktiengesellschaft, Frankfurt, Fed. Rep. of Germany

[21] Appl. No.: 803,043

[22] Filed: Dec. 6, 1991

[30] Foreign Application Priority Data

Jan. 7, 1991 [DE] Fed. Rep. of Germany ....... 4100217

[51] Int. Cl.$^5$ .......................... C08H 4/28; C08K 5/54; C08K 3/34
[52] U.S. Cl. ..................................... 526/227; 524/262; 524/265; 524/442; 526/230.5; 526/232.1
[58] Field of Search ............... 524/262, 263, 265, 442; 526/227, 230.5, 232.1

[56] References Cited

U.S. PATENT DOCUMENTS 4,524,169  6/1985  Wolff et al. .......................... 524/263

FOREIGN PATENT DOCUMENTS 2237459  2/1974  Fed. Rep. of Germany .

Primary Examiner—Thurman K. Page
Assistant Examiner—Tae H. Yoon
Attorney, Agent, or Firm—Beveridge, DeGrandi, Weilacher & Young

[57] ABSTRACT

Moulding materials vulcanizable by means of the action of heat which contain a thiocyanatopropyltrialkoxysilane and a method of their manufacture are disclosed.

7 Claims, No Drawings

PEROXIDE VULCANIZABLE MOULDING MATERIALS AND A METHOD OF THEIR MANUFACTURE

BACKGROUND OF THE INVENTION

The present invention relates to vulcanizable molding materials, and more particularly, those that are peroxide vulcanizable by means of the action of heat. In another aspect, the present invention relates to a method of manufacture of such materials.

In particular, polymers which have no or only few double bonds available in the molecule must be cross-linked with peroxide. The most important peroxide cross-linkable polymer types in this connection are: ethylene vinyl acetate EVA), ethylene propylene copolymerizates (EPM), ethylene propylenediene copolymerizate (EPDM), silicon rubber and polyethylene.

It is possible, with peroxidic cross-linking, to produce C-C bridges between two polymer chains which bridges are responsible for good ageing and compression set of the rubber article on account of their high bonding energy and the short bonding length. Peroxidic cross-linking is therefore also used when extreme requirements (e.g. the use of rubber articles in hot, aggressive media) are placed on the article.

The permanent deformation (compression set) of a mixture (measured according to ASTM D 395) is of great importance as a factor for the stability and accuracy of size and, accordingly, for the use especially of industrial articles, e.g. seals, rollers, hoses, and the like, but also for use on shoe soles. The lower the compression set, the higher the utility of the rubber product (e.g. tightness of a seal).

One possibility for improving this property as well as others is the use of bifunctional organosilicon compounds.

DE-A8 23 28 630 teaches a method for the peroxidic cross-linking of polyethylene in which polyethylene is reacted with an organosilicon compound containing an olefinically unsaturated group in the presence of a compound supplying free radicals. This product is then treated with a silanol condensation catalyst and water.

In practice, vinyl silanes are used practically exclusively for this purpose; however, they have a number of disadvantages: they exhibit a low flash point and, in addition, a high volatility on account of their low boiling point, which proves to be a problem at the temperatures used in the rubber industry, especially when being mixed in, when the silane is not yet bound to the filler used as reinforcing filler. Further disadvantages of the use of vinyl silanes are short ultimate elongations, extremely poor tearing resistances, low energies at break and a poor fatigue behavior in the particular vulcanizates.

SUMMARY OF THE INVENTION

An object of the invention is to provide peroxidically cross-linkable (vulcanizable) molding materials in which the disadvantages are largely avoided but at the same time a compression set is obtained similar to that found when using vinyl silanes.

In attaining the above and other objects, one feature of the invention is to provide molding materials vulcanizable by means of the action of heat with peroxides, comprising at least one polymer, customary auxiliary agents, silicate filler and an organosilicon compound. The molding compositions of the present invention are characterized in that they contain as organosilicon compound 0.1 to 50 parts by weight, preferably 1–15 parts by weight, relative to 100 parts by weigh a thiocyanatopropyltrialkoxysilane of the formula (I)

$$(RO)_3Si-(CH_2)_3-SCN$$

in which R corresponds to an alkyl group with 1 to 8 carbon atoms.

The basic compositions of peroxidically vulcanizable synthetic polymeric molding materials in general are known to persons skilled in the art. Any suitable polymers of this type can be used for purposes of the present invention.

The polymers are especially ethylene vinyl acetate (EVA), ethylene propylenediene copolymerizate (EPDM). silicon rubber and polyethylene or their mixtures, to the extent that they can be mixed with each other.

Examples of cross-linking agents are:
1,1-bis-(tert.-butylperoxy)-3,3,5-trimethylcyclohexane,
tert.-butylperoxyisopropylcarbonate,
tert.-butylperoxybenzoate,
dicumylperoxide,
$\alpha,\alpha$-bis-(tert.-butylperoxy)-diisopropylbenzene,
2,5-dimethyl-2,5-di-(tert.-butylperoxy)-hexane,
2,5-dimethyl-2,5-di-(tert.-butylperoxy)-hexyne-3,
di-tert.-butylperoxide, and the like, which are added in an amount of approximately 1 to 10 parts by weight per 100 parts by weight of the polymer.

DETAILED DESCRIPTION OF THE INVENTION

As a rule, the molding materials contain generally known natural or synthetic silicate fillers (e.g. clays, kaolins, precipitated and pyrogenic silicas, silicates, etc) with BET surfaces (measured with nitrogen) between 1 and 1000 $m^2/g$, preferably 5 to 300 $m^2/g$, with whose hydroxyl groups the trialkoxysilyl groups of the compounds used in accordance with the invention react, splitting off an alcohol and thus resulting in a chemical bond between the filler and silane.

Generally, 5 to 250 parts by weight, preferably 20 to 100 parts by weight relative to 100 parts by weight of the polymer are used.

The filler is either separately introduced into the molding composition or incorporated together with the organosilicon compound. A premixture or a filler reacted with the organosilicon compound can be used for this purpose.

Methods of manufacturing fillers modified in this manner are described in EP patent 0,177,674 and in German application P 40 04 781.4. If the compounds to be used in accordance with the invention are added to the mixture to be vulcanized in situ or also in modified form, this results in a lowering of the viscosity of the mixture and thus in a better workability.

The vulcanizable molding materials of the invention are manufactured according to the generally known methods. The components are mixed—except for the peroxidic cross-linking agent—in any desired sequence until a homogenous mixture has been achieved.

After the addition of the peroxide and the suitable elevation of temperature, the vulcanization begins. The traditional components, as they are generally used, include e.g. anti-ageing agents, softeners, auxiliary processing agents, stabilizers, pigments as well as other organosilicon compounds with a different structure. Any one or more of these components can be added in a suitable amount sufficient to perform their expected function. It turned out that as regards the compression set values, the molding materials of the invention are comparable to molding materials containing vinyl silanes. Improvements result from the significantly longer ultimate elongation, the higher energy at break, the improved tearing resistances and the better fatigue behavior of the vulcanized molding materials of the invention.

The following examples emphasize the advantages of the molding materials of the invention over the state of the art.

| Test standards for the evaluation: | | |
|---|---|---|
| | Test method | Units |
| Tensile strength | DIN 53 504 | MPa |
| Ultimate elongation | DIN 53 504 | min. |
| Energy at break | DIN 53 504 | J |
| Tearing resistance | DIN 53 507 | N/mm |
| Mooney viscosity | DIN 53 523/524 | ME (Mooney unit) |
| Compression set B | ASTM D 395 | % |
| De Mattia | ASTM D 813 | Kc |

The following names and abbreviations, the meaning of which is listed here, are used in the examples of application:

| | |
|---|---|
| Buna AP 451 | EPDM of the Bayer company |
| Keltan 778 | EPDM of the DSM company |
| Perkadox 14/40 | 1,3-bis-(tert.-butyl-peroxyl-isopropyl)-benzene |
| A 172 | triethoxyvinyl silane of UCC |
| Si 264 | 3-thiocyanatopropyltriethoxysilane |
| Durosil | precipitated silica from Degussa (BET = 60 m²/g) |
| TRIM | activator |
| Flexon 876 | paraffinic softener |
| Protector G 3108 | antiozone wax |
| Weissoel 530 | paraffinic softener |
| Suprex Clay | aluminum silicate |
| Vulkanox HS | 2,2,4-trimethyl-1,2-dihydroquinoline |
| Winnofil S | precipitated calcium carbonate |

EXAMPLE 1

Si 264 in a Peroxidically Cross-linked Cable Jacket Mixture Based on EPDM Compared with a Mixture without Silane

| | | 1 | 2 |
|---|---|---|---|
| Keltan 778 | | 100 | 100 |
| Weissoel | | 10 | 10 |
| Winnofil S | | 50 | 50 |
| Suprex Clay | | 100 | 100 |
| Flexon 876 | | 25 | 25 |
| ZnO RS | | 5 | 5 |
| Protector G 3108 | | 5 | 5 |
| Vulkanox HS | | 1 | 1 |
| TRIM | | 1.5 | 1.5 |
| Si 264 | | — | 2 |
| Perkadox 14/40 | | 5 | 5 |
| Mooney viscosity ML 4 (100° C.) | ME | 64 | 57 |
| Vulcanizate data: | 180° C./t95% | | |
| Molulus 300% | MPa | 4.2 | 7.8 |
| Compression set | | | |
| 22 h/70° C. | % | 20.8 | 16.3 |

| -continued | | | |
|---|---|---|---|
| | | 1 | 2 |
| 70 h/100° C. | % | 20.0 | 14.1 |

Si 264 results in an improvement of the processing behavior, an elevation of the modulus and in an improvement of the compression set values.

EXAMPLE 2

Si 264 in a Peroxidically Cross-linked EPDM Mixture (Computer Pads) Compared with Vinyl Silane

| | | 1 | 2 |
|---|---|---|---|
| Buna AP 451 | | 100 | 100 |
| Durosil | | 60 | 60 |
| A 172 | | 1 | — |
| Si 264 | | — | 1 |
| Perkadox 14/40 | | 4 | 4 |
| Vulcanizate data: | 180° C./t95% | | |
| Tensile strength | MPa | 12.1 | 13.3 |
| Ultimate elongation | % | 120 | 210 |
| Energy at break | J | 20.6 | 41.7 |
| Tearing resistance | N/mm | 8 | 15 |
| Compression set 70 h/100° C. | % | 7.2 | 6.8 |
| Fatigue behavior - De Mattia Crack formation without puncture Kilocycle until crack length 25 mm | | 0.100 | 0.7 |

Si 264 exhibits, in comparison to vinyl silane, a clearly longer ultimate elongation, a better fatigue behavior, a higher energy at break and a better tearing resistance at almost the same compression set value.

Further variations and modifications of the foregoing will be apparent to those skilled in the art and are intended to be encompassed by the claims appended hereto.

German priority application No. P 40 00 217.2 is relied on and is incorporated herein by reference.

We claim:

1. A molding material vulcanizable by means of the action of heat with peroxides, comprising at least one peroxide cross-linkable polymer, a silicate filler and an organosilicon compound, said organosilicon compound being present in the amount of 0.1 to 50 parts by weight, relative to 100 parts by weight of said polymer, and being a thiocyanatopropyltrialkoxysilane of the formula (I)

$$(RO)_3Si-(CH_3)_3-SCN \tag{I}$$

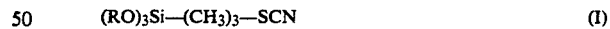

in which R corresponds to an alkyl group with 1 to 8 carbon atoms; and a peroxy cross-linking agent which is used to vulcanize the molding material.

2. The molding material according to claim 1, wherein said organosilicon compound is present in the amount of 1 to 15 parts by weight.

3. The molding material according to claim 1, wherein said polymer is selected rom the group consisting of ethylene vinyl acetate (EVA), ethylene propylene copolymerizates (EPM), ethylene propylenediene copolymerizate (EPDM), silicon rubber and polyethylene.

4. A method of manufacturing molding materials according to claim 1, comprising mixing 0.1 to 50 parts by weight of a compound according to formula I:

$(RO)_3Si-(CH_2)_3-SCN$ wherein R is an alkyl of 1 to 8 carbons in the presence of a silicate filler with at least one polymer to distribute said compound uniformly in said polymer to thereby produce a molding material of improved properties.

5. The molding material according to claim 1, wherein said peroxy cross-linking agent is selected from the group of: 1,1-bis(tert.-butylperoxy)-3,3,5-trimethyl-cyclohexane; tert.-butylperoxyisopropylcarbonate; tert.-butylperoxybenzoate; dicumylperoxide; $\alpha,\alpha'$-bis-(tert.-butylperoxy)-diisopropylbenzene; 2,5-dimethyl-2,5-di-(tert.-butylperoxy)-hexane; 2,5-dimethyl-2,5-di-(tert.-butylperoxy)-hexyne-3; di-tert.-butylperoxide; and 1,3-bis-(tert.-butylperoxyl-isopropyl)-benzene.

6. The molding material according to claim 5, wherein the peroxide cross-linking agent is present in the amount of 1 to 10 parts by weight per 100 parts by weight of the polymer.

7. The molding material according to claim 1, wherein the peroxide cross-linking agent is present in the amount of 1 to 10 parts by weight per 100 parts by weight of the polymer.

* * * * *